(12) United States Patent
Sandberg et al.

(10) Patent No.: US 9,451,548 B2
(45) Date of Patent: Sep. 20, 2016

(54) METHOD, WIRELESS DEVICE COMPUTER PROGRAM AND COMPUTER PROGRAM PRODUCT FOR USE WITH DISCONTINUOUS RECEPTION

(71) Applicant: Telefonaktiebolaget L M Ericsson (publ), Stockholm (SE)

(72) Inventors: David Sandberg, Solna (SE); Björn Nordstróm, Stockhom (SE); Eric Parsons, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 213 days.

(21) Appl. No.: 14/239,292

(22) PCT Filed: Sep. 20, 2013

(86) PCT No.: PCT/SE2013/051102
§ 371 (c)(1),
(2) Date: Feb. 18, 2014

(87) PCT Pub. No.: WO2014/129948
PCT Pub. Date: Aug. 28, 2014

(65) Prior Publication Data
US 2015/0131503 A1    May 14, 2015

Related U.S. Application Data

(60) Provisional application No. 61/767,432, filed on Feb. 21, 2013.

(51) Int. Cl.
H04W 76/04    (2009.01)
H04W 52/02    (2009.01)
H04W 72/04    (2009.01)

(52) U.S. Cl.
CPC ..... *H04W 52/0235* (2013.01); *H04W 72/0406* (2013.01); *H04W 76/048* (2013.01)

(58) Field of Classification Search
None
See application file for complete search history.

(56) References Cited

U.S. PATENT DOCUMENTS

2009/0181670 A1\* 7/2009 Tseng .................. H04W 76/048
                                                               455/434
2009/0310503 A1   12/2009 Tenny et al.
(Continued)

FOREIGN PATENT DOCUMENTS

EP    2654348 A1   10/2013
WO    2006126920 A1   11/2006
(Continued)

*Primary Examiner* — Wei Zhao
*Assistant Examiner* — Ronald H Davis
(74) *Attorney, Agent, or Firm* — Coats & Bennett, P.L.L.C.

(57) ABSTRACT

It is presented a method performed in a wireless device of a cellular network also comprising a radio base station, the wireless device being in a discontinuous reception mode comprising receiving periods and idle periods. The method comprises the steps of: determining that a control signal is expected to be received from a radio base station during a primary receiving period; when a control signal fails to be correctly received from the radio base station during the primary receiving period, adding a secondary receiving period covering a first time interval when a new control signal is expected to be received; and when a control signal is correctly received from the radio base station during the primary receiving period refraining from adding a secondary receiving period. Corresponding wireless devices computer program and computer program products are also presented.

24 Claims, 7 Drawing Sheets

(56) References Cited

U.S. PATENT DOCUMENTS

| | | | |
|---|---|---|---|
| 2010/0035624 A1* | 2/2010 | Tseng | H04W 76/048 455/450 |
| 2010/0106490 A1* | 4/2010 | Svedberg | G10L 19/012 704/215 |
| 2010/0130214 A1* | 5/2010 | Ahluwalia | H04W 76/048 455/450 |
| 2013/0084848 A1* | 4/2013 | Dalsgaard | H04W 52/0216 455/422.1 |
| 2013/0279443 A1 | 10/2013 | Imagawa et al. | |
| 2014/0112243 A1* | 4/2014 | Suzuki | H04W 56/00 370/328 |
| 2014/0211673 A1* | 7/2014 | Lu | H04W 52/0212 370/311 |
| 2014/0247742 A1* | 9/2014 | Lee | H04W 52/0216 370/252 |
| 2015/0071179 A1* | 3/2015 | Zhang | H04W 52/04 370/329 |

FOREIGN PATENT DOCUMENTS

| | | |
|---|---|---|
| WO | 2010044721 A1 | 4/2010 |
| WO | 2012081093 A1 | 6/2012 |
| WO | 2013134050 A1 | 9/2013 |

* cited by examiner

METHOD, WIRELESS DEVICE COMPUTER PROGRAM AND COMPUTER PROGRAM PRODUCT FOR USE WITH DISCONTINUOUS RECEPTION

TECHNICAL FIELD

The invention relates to a method and a wireless device where discontinuous reception is applied.

BACKGROUND

Cellular communication networks evolve towards higher data rates, together with improved capacity and coverage. In the 3rd Generation Partnership Project (3GPP) standardization body, several technologies have been and are also currently being developed.

LTE is a recent standardised technology. It uses an access technology based on OFDM (Orthogonal Frequency Division Multiplexing) for the downlink (DL) and Single Carrier FDMA (SC-FDMA) for the uplink (UL). The resource allocation to wireless devices on both DL and UL is performed adaptively by the concept of fast scheduling, taking into account the instantaneous traffic pattern and radio propagation characteristics of each wireless device. Assigning resources in both DL and UL is performed in the scheduler situated in the radio base station.

In order to save power in wireless devices, DRX (Discontinuous Reception) can be used. A DRX cycle consists of a receiving period (also known as on duration) and an idle period (also known as off duration). No data can be received during the energy saving idle period, but only during the receiving period.

DRX is configured per wireless device and is governed by a set of power state parameters. However, it is not evident how to set the power state parameters. On the one hand, it is desired to save power by having long idle periods. But on the other hand, negative effects resulting from setting the wireless device in an inactive state, even temporarily, should be avoided if possible.

WO2010/044721 discloses methods and apparatus for controlling discontinuous receiver operation in a wireless communication device. In an exemplary embodiment, a wireless communication device configured to monitor a downlink signal during a series of regularly scheduled awake intervals and monitor the downlink signal for retransmissions during retransmission-monitoring intervals scheduled at a first predetermined delay from each detected data transmission to the receiver includes a control circuit configured to detect that a first retransmission-monitoring interval overlaps a previously scheduled radio activity during which the receiver is unavailable to monitor the first downlink signal, such as a measurement gap, and to adjust the first retransmission-monitoring interval, add an additional retransmission-monitoring interval, or both, responsive to said detecting. However, such a solution requires a successful detection of PDCCH transmissions to start additional retransmission-monitoring interval.

It would be greatly beneficial if discontinuous reception can be employed to reduce power requirements in the wireless device, but with reduced risk of any ill-effects due to the idle period.

SUMMARY

It is an object to improve an ability to receive retransmissions of control signals when discontinuous reception is employed.

According to a first aspect, it is presented a method performed in a wireless device of a cellular network also comprising a radio base station, the wireless device being in a discontinuous reception mode comprising receiving periods and idle periods. The method comprises the steps of: determining that a control signal is expected to be received from a radio base station during a primary receiving period; when a control signal fails to be correctly received from the radio base station during the primary receiving period, adding a secondary receiving period covering a first time interval when a new control signal is expected to be received; and when a control signal is correctly received from the radio base station during the primary receiving period refraining from adding a secondary receiving period.

In other words, the secondary receiving period is only added when the control signal fails to be correctly received from the radio base station during the receiving period. In this way, the wireless device is not in an idle mode when the new control signal is expected. This makes it possible for the wireless device to receive the new control signal and act in accordance with the new control signal, compared to the prior art, where such a signal would certainly be lost if the wireless device were to be in an idle mode.

In the step of adding a secondary receiving period, the new control signal may be expected to be received as a result of the failed reception of the control signal. For example, the new control signal can be a retransmission of the content of the original control signal.

The method may further comprise the step of: setting at least some receiving modules in an idle mode when the receiving period has ended. In one embodiment, the wireless device is unable to receive any control signals or data when in the idle mode, which conserves energy and improves battery life.

The wireless device may be only able to receive signals from the radio base station during receiving periods.

The step of adding a secondary receiving period may comprise adding the secondary receiving period as an extension to the primary receiving period.

The step of adding a secondary receiving period may comprise adding the secondary receiving period separate from the primary receiving period. In this way, the wireless device can be in an idle mode in the time between the primary receiving period and the secondary receiving period.

In the step of determining that a control signal is expected to be received from a radio base station during a primary receiving period, the primary receiving period may be a period in a discontinuous reception scheme when receiving is active.

The first time interval may cover a round-trip delay time expected for Hybrid Automatic Repeat reQuest, HARQ, relative to the primary receiving period.

The step of determining that a control signal is expected to be received from a radio base station during a primary receiving period may be based on the wireless device being in talk mode of Voice Over Internet Protocol, VoIP.

The control signals may be signals sent over a physical downlink control channel.

The control signals may contain resource allocations for a future downlink payload signal.

The control signals may contain resource allocations for a future uplink payload signal.

According to a second aspect, it is presented a wireless device arranged to be part of a cellular network also comprising a radio base station. The wireless device comprises: a processor; and a computer program product storing instructions that, when executed by the processor, causes the wireless device, when in a discontinuous reception mode comprising receiving periods and idle periods, to: determine that a control signal is expected to be received from a radio base station during a primary receiving period; when a control signal fails to be correctly received from the radio base station during the primary receiving period, add a secondary receiving period covering a first time interval when a new control signal is expected to be received; and when a control signal is correctly received from the radio base station during the primary receiving period refrain from adding a secondary receiving period.

The computer program product may be a memory of the wireless device.

In the instructions to add a secondary receiving period, the new control signal may be expected to be received as a result of the failed reception of the control signal.

The instructions may further comprise instructions that, when executed by the processor, causes the wireless device to: set at least some receiving modules in an idle mode when the receiving period has ended.

The wireless device may be only able to receive signals from the radio base station during receiving periods.

The instructions to add a secondary receiving period may comprise instructions that, when executed by the processor, causes the wireless device to add the secondary receiving period as an extension to the primary receiving period.

The instructions to add a secondary receiving period may comprise instructions that, when executed by the processor, causes the wireless device to add the secondary receiving period separate from the primary receiving period.

The instructions to determine that a control signal is expected to be received from a radio base station during a primary receiving period may comprise instructions that, when executed by the processor, causes the wireless device to consider the primary receiving period to be a period in a discontinuous reception scheme when receiving is active.

The first time interval may be covers a round-trip delay time expected for Hybrid Automatic Repeat reQuest, HARQ, relative to the primary receiving period.

The instructions to determine that a control signal is expected to be received from a radio base station during a primary receiving period may comprise instructions that are based on the wireless device being in talk mode of Voice Over Internet Protocol, VoIP.

The control signals may be signals sent over a physical downlink control channel.

The control signals may contain resource allocations for a future downlink payload signal.

The control signals may contain resource allocations for a future uplink payload signal.

According to a third aspect, it is presented a wireless device comprising means for determining that a control signal is expected to be received from a radio base station during a primary receiving period, the wireless device being arranged to be part of a cellular network also comprising the radio base station, the wireless device being in a discontinuous reception mode comprising receiving periods and idle periods; means for adding a secondary receiving period covering a first time interval when a new control signal is expected to be received, when a control signal fails to be correctly received from the radio base station during the primary receiving period; and means for refraining from adding a secondary receiving period when a control signal is correctly received from the radio base station during the primary receiving period.

The new control signal may be expected to be received as a result of the failed reception of the control signal.

The wireless device may further comprise means for setting at least some receiving modules in an idle mode when the receiving period has ended.

The wireless device may be only able to receive signals from the radio base station during receiving periods.

The means for adding a secondary receiving period may comprise means for adding the secondary receiving period as an extension to the primary receiving period.

The means for adding a secondary receiving period may comprise means for adding the secondary receiving period separate from the primary receiving period.

The primary receiving period may be a period in a discontinuous reception scheme when receiving is active.

The first time interval may cover a round-trip delay time expected for Hybrid Automatic Repeat reQuest, HARQ, relative to the primary receiving period.

The means for determining that a control signal is expected to be received from a radio base station during a primary receiving period may be based on the wireless device being in talk mode of Voice Over Internet Protocol, VoIP.

The control signals may be signals sent over a physical downlink control channel.

The control signals may contain resource allocations for a future downlink payload signal.

The control signals may contain resource allocations for a future uplink payload signal.

According to a fourth aspect, it is presented a computer program comprising computer program code which, when run on a wireless device arranged to be part of a cellular network also comprising a radio base station, causes the wireless device to: determine that a control signal is expected to be received from a radio base station during a primary receiving period; when a control signal fails to be correctly received from the radio base station during the primary receiving period, add a secondary receiving period covering a first time interval when a new control signal is expected to be received; and when a control signal is correctly received from the radio base station during the primary receiving period refrain from adding a secondary receiving period.

According to a fifth aspect, it is presented a computer program product comprising a computer program according to the fourth aspect and a computer readable means on which the computer program is stored.

It is to be noted that any feature of any aspect may, where possible, be applied to any other aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
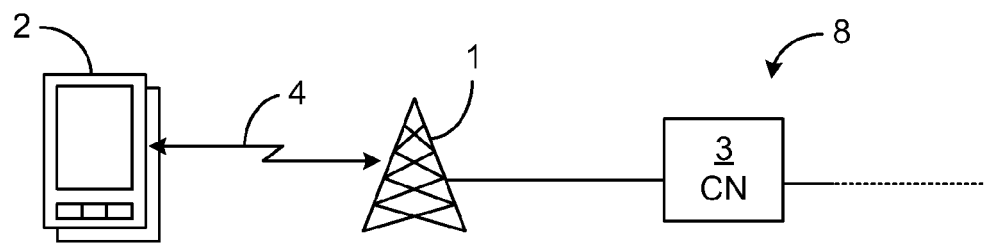
FIG. 1 is a schematic diagram illustrating a cellular network where embodiments presented herein may be applied.

FIG. 1 is a schematic diagram illustrating a cellular network 8 where embodiments presented herein may be applied. The cellular network 8 comprises a core network 3 and one or more radio base stations 1, here in the form of evolved Node Bs, also known as eNode Bs or eNBs. The radio base station 1 could also be in the form of Node Bs, BTSs (Base Transceiver Stations) and/or BSSs (Base Station Subsystems), etc. The radio base station 1 provides radio connectivity to a plurality of wireless devices 2. The term wireless device is also known as mobile communication terminal, user equipment (UE), mobile terminal, user terminal, user agent, wireless terminal, machine-to-machine devices etc., and can be, for example, what today are commonly known as a mobile phone or a tablet/laptop with wireless connectivity or fixed mounted terminal.

The cellular network 8 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Uplink communication (from the wireless device) and downlink communication (to the wireless device) between the wireless device 2 and the radio base station 1 occur over a wireless radio interface 4. The quality of the wireless radio interface 4 to each wireless device 2 can vary over time and depending on the position of the wireless device 2, due to effects such as fading, multipath propagation, interference, etc.

The radio base station 1 is also connected to the core network 3 for connectivity to central functions and to a wide area network, such as the Internet.

Figure 2:
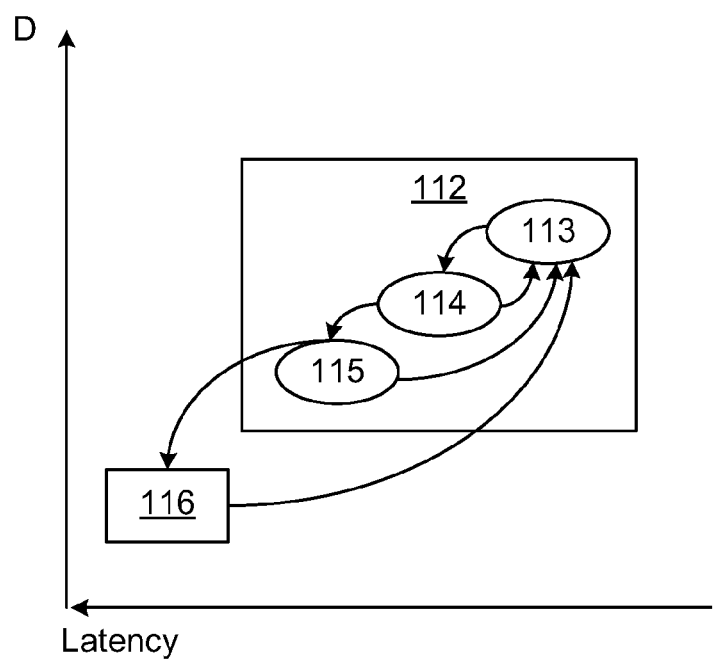
FIG. 2 is a state diagram illustrating various power states for a wireless device of FIG. 1 in a discontinuous reception mode.

FIG. 2 is a state diagram illustrating various power states for a wireless device 2 of FIG. 1 in a discontinuous reception mode. Each state uses an average power and involves an average latency for communication. In the diagram of FIG. 2, states further to the left involve a greater latency and states further up involve greater average power usage for the wireless device 2 in question.

The states are used for Discontinuous Reception (DRX), which is a feature provided in LTE/E-UTRAN (Evolved UMTS (Universal Mobile Telecommunications System) Terrestrial Radio Access Network) for power saving in the wireless device 2, and thus reduced battery consumption. A DRX cycle consists of a receiving period of an on duration and an idle period of an off duration, with a combined period of the on duration plus the off duration. No data can be received during the energy saving off duration, whereby the wireless device 2 is in an incommunicable state. If data is received in downlink during the on duration, or if data is sent via uplink, the wireless device 2 will stay awake and start an inactivity timer. When in the on state, the wireless device 2 is in a communicable state.

There are other examples of discontinuous reception modes for determining when going into an off state. For example, there is network assisted power saving, which is a solution for wireless device power optimization which is being discussed in 3GPP at the time of filing this application.

There are two main states shown in FIG. 2, an RRC_IDLE state 116 and an RRC_CONNECTED state 112. In DRX, the RRC_CONNECTED state 112 comprises three individual states: a long DRX state 115, a short DRX state 114 and an active state 113. The active state 113 is above the other states 114, 115, 116 in the diagram of FIG. 2, thereby using more power. Hence, the short DRX state 114, the long DRX state and the RRC_IDLE state 116 are known as power saving states. In other words, the power saving states 114, 115, 116 all use less power on average than the active state 113.

When in one of the long and short DRX states 114-115, the wireless device 2 does not constantly monitor the PDCCH (Physical Downlink Control Channel), but only during specific receiving periods. During these states 114-115, the wireless device 2 goes into power saving idle mode, being an off period, for part of the time, which decreases power consumption.

Hence, two DRX cycles can be set for each wireless device 2: a short DRX cycle and a long DRX cycle for the short DRX state 114 and the long DRX state 115, respectively. When the wireless device 2 is in the active state 113, an inactivity timer is started after a downlink packet is received. When the inactivity timer expires, the wireless device 2 switches to the short DRX state 114. In the short DRX state 114, the wireless device 2 can only receive packets during the on duration.

From the RRC_IDLE state 116, a random access procedure is required to get the wireless device 2 back to the RRC_CONNECTED state 112 in general, and the active state 113 in particular.

There are a number of power state parameters that can be configured in the DRX state, such as on duration, the inactivity timer, the short DRX cycle timer, the long DRX cycle timer, the duration of the short DRX cycle, the duration of the long DRX cycle, retransmission timer, start offset, etc. These power state parameters can be configured for each wireless device 2 separately and thus at least partly define when the wireless device 2 is to be in an active state or one of the power saving states 114, 115, 116. The retransmission timer parameter specifies the maximum number of consecutive PDCCH (Physical Downlink Control Channel) subframes the wireless device 2 should remain active to be ready to receive an incoming retransmission after the first available retransmission time. The start offset parameter is an offset for each wireless device 2 so that, in the time domain, not all wireless devices 2 start receiving at the same time.

Looking now to voice traffic, in LTE all packets are delivered using IP (Internet Protocol). This means that also traditionally circuit switched services such as voice conversation will make use of fast scheduling and is implemented using Voice over IP (VoIP). In a typical VoIP arrangement, a voice encoder on the transmitter side encodes the speech into packets with a typical periodicity of 20 ms. The speech encoders also uses Voice Activity Detection in order to identify when there are talk spurts, denoted a talk state, and when there is only silence, denoted silent state. During the silent state, the voice encoder generates Silence Indication Descriptor (SID) frames that the receiver uses to generate comfort noise. The SID frames have a much longer spacing (160 ms compared to 20 ms in the talk state) and are also smaller (~400 bits compared to ~600 bits in the talk state).

Figure 3:
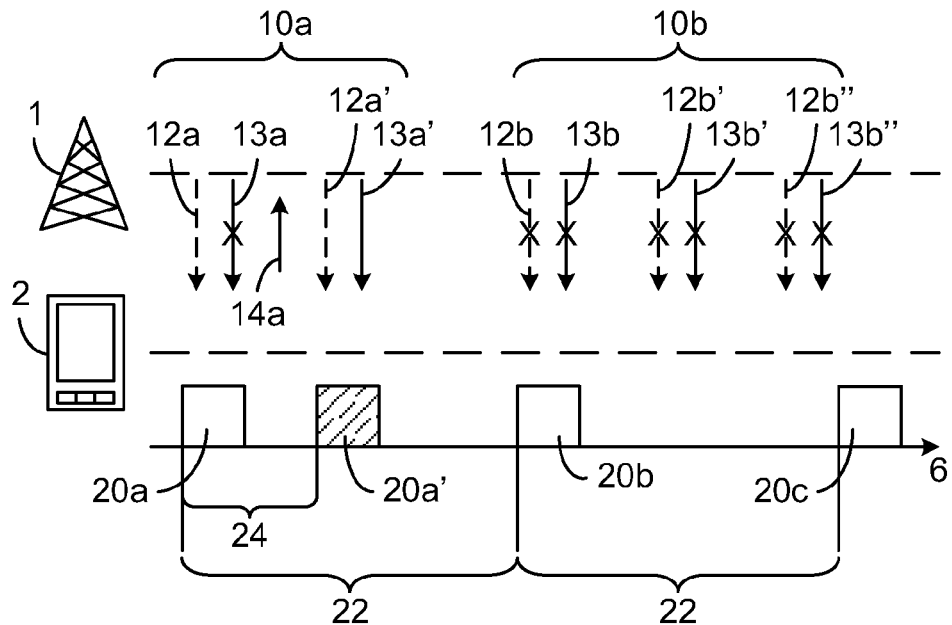
FIGS. 3-7 are schematic diagrams illustrating signalling between the radio base station and the wireless device of FIG. 1 according to various embodiments.

Looking now to FIG. 3, in order to manage battery performance effectively, the DRX parameters for the wireless device 2 are set appropriately. In particular, DRX can be configured so that the wireless device 2 has an on duration 20a, 20b, 20c of 2 ms (the "on duration") within a period 22 of 20 ms or 40 ms, aligned with a voice sampling interval. However, it can sometimes occur over radio interfaces that the transmission of control signaling for either downlink or uplink transmission is missed by the wireless device 2, rendering it impossible to recover until the next receiving period ("on duration"). It is particularly problematic in that it takes some time for the radio base station 1 to determine that the wireless device 2 missed the transmission, and the states between the radio base station 1 and the wireless device 2 need to be re-synchronized. The net effect is an increased risk of dropped packets and a deterioration of the overall voice quality.

Looking now in more detail at this issue in FIG. 3, the dashed arrows represent control signalling and the solid arrows represent payload data. A cross on an arrow indicates a failure by the recipient to receive and/or decode the signal. In this example, the downlink control signalling is transmitted over a Physical Downlink Control Channel (PDCCH) and the downlink payload data is transmitted over a Physical Downlink Shared Channel (PDSCH). Time flows from left to right and with the radio base station 1 above the wireless device 2, uplink data is upwards and downlink data is downwards.

There is a first period of time boa relating to a first downlink packet (such as a VoIP packet) and a second period of time 10b relating to a second downlink packet (such as a VoIP packet). In a primary receiving period 20a, the wireless device 2 receives a first control signal 12a comprising resource allocations, e.g. indicating how to receive the downlink payload data. Due to e.g. non-ideal radio conditions, the first downlink payload signal 13a fails to be correctly received at the wireless device 2. The failed first downlink signal 13a can, e.g., be detected by a mismatch in cyclic redundancy check (CRC). The wireless device 2 notifies the failed reception in a first failure indication message 14a. For example the first failure indication message 14a can be a non-acknowledgement (NACK) in accordance with Hybrid Automatic Repeat reQuest (HARQ), e.g. sent over a Physical Uplink Control Channel (PUCCH).

When the radio base station 1 has received the first failure indication message 14a, the radio base station decides to retransmit the content of the first downlink payload signal 13a, and it sends a new first control signal 12a' indicating how to receive new downlink payload data. The new downlink payload data is then sent in a retransmission 13a' of the first downlink payload signal.

Since the wireless device 2 failed the first reception of the first downlink payload signal 13a, it expects a retransmission and is thus in a secondary receiving period 20a', which is placed in time based on the Round-trip delay time 24 expected for HARQ, e.g. 8 ms. The wireless device 2 can thus receive the new first control signal 12a' and the subsequent retransmission 13a' of the first downlink payload signal. In this way, the first downlink packet has been received by the wireless device 2.

Looking now at the second time period 10b for the second downlink packet, the radio base station 1 sends a second control signal 12b indicating how to receive downlink payload data, e.g., resource allocations for a future downlink payload signal. However, e.g., due to non-ideal radio conditions, the second control signal 12b fails to be correctly received at the wireless device 2. The wireless device 2 is then unaware of the resource assignment for the second downlink payload signal 13b and is also unable to receive that signal 13b.

Since the wireless device 2 did not detect the second control signal 12b containing the downlink assignment, it will not monitor PDCCH in order to detect a retransmission. Hence, if sent, neither any subsequent retransmissions of the second control signal 12b', 12b" nor any subsequent retransmissions of the second downlink payload signal 13b', 13b" will be received by the wireless device 2, unless, by chance, they happen to occur during a receiving period 20c.

The missed control signal 12b will hence cause a mismatch between the discontinuous reception state in the wireless device 2 and its mirror in the radio base station 1. In one embodiment, the radio base station 1 will continue to schedule retransmissions every 8 ms until the HARQ retransmission timer expires and the voice packet is consequently lost.

This will have to be handled by higher layers, resulting in reduced performance and/or quality.

Figure 4:
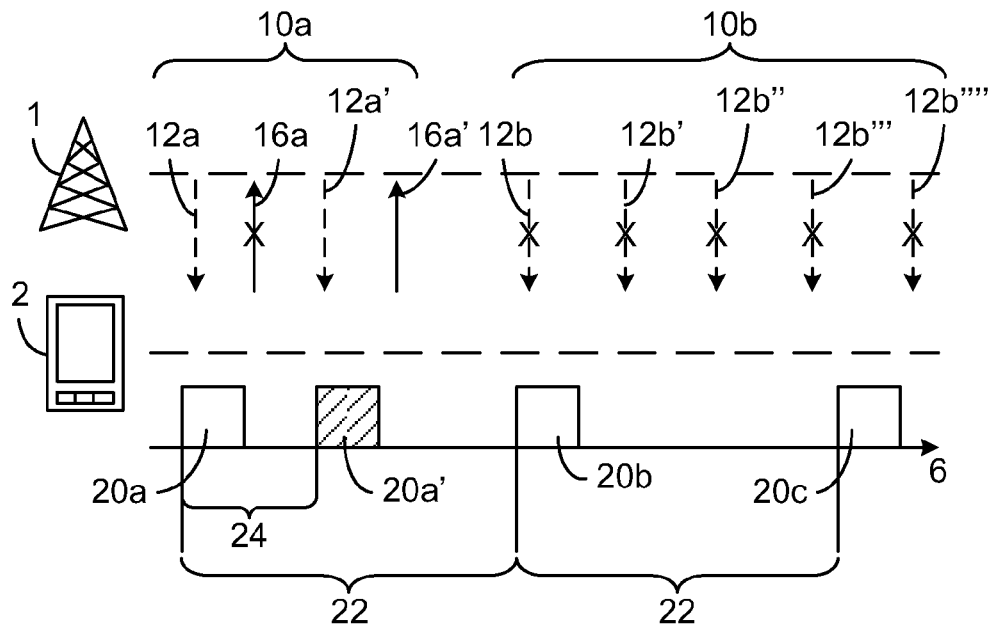

FIG. 4 illustrates a situation similar to that of FIG. 3, but for uplink. In this example, the downlink control signalling is transmitted over a Physical Downlink Control Channel (PDCCH) and the uplink payload data is transmitted over a Physical Uplink Shared Channel (PUSCH).

In the current LTE product scheduler, a situation similar to the downlink example described above occurs also in the uplink. The scheduler of the radio base station 1 employs a technique to mask wireless device 2 scheduling requests (SR) during uplink talk spurts. This allows the wireless device 2 to remain asleep even for uplink VoIP transmissions, except for receiving periods ("on duration") when it receives a spontaneous uplink grant for VoIP data transmission. The problem once again occurs if the wireless device 2 misses the downlink control signal, here containing the resource allocation (grant) for uplink transmission. There is then no opportunity to recover the transmission until the next receiving period.

As will be explained in more detail below, the same behaviour as for the downlink scenario is shown, where the discontinuous reception state in the radio base station 1 is not synchronized with the wireless device 2, causing a lost packet also here. But this case only happens when the SR mask functionality is enabled.

The first time period boa here relates to a first uplink packet, such as a VoIP packet and the second time period 10b here relates to a second uplink packet, such as a VoIP packet. A first downlink control signal 12a is sent from the radio base station 1 to the wireless device 2, to communicate scheduled resources for the first uplink packet. The wireless device 2 then sends a first uplink payload signal 16a.

However, the first uplink payload signal 16a fails to be received at the radio base station 1, e.g. due to non-ideal radio conditions. The failed first uplink signal 16a can e.g. be detected by a mismatch in cyclic redundancy check (CRC).

Since the radio base station 1 failed the reception of the first uplink payload signal 16a, it sends a retransmission of the first downlink control signal 12a' in a secondary receiving period 20a' which is placed in time based on the Round-trip delay time 24 expected for HARQ, e.g. 8 ms. The wireless device 2 can thus receive the new first control signal 12a' and can issue a retransmission 16a' of the first uplink payload signal. In this way, the first uplink packet has been received by the radio base station 1. It is to be noted that the receiving periods 20a, 20a', 20b, 20c only define windows restricting of when the wireless device 2 receives downlink data; the wireless device 2 is free to transmit uplink data at any time.

Looking now at the second time period 10b for the second uplink packet, the radio base station 1 sends a second control signal 12b indicating how to transmit any uplink payload data. However, e.g. due to non-ideal radio conditions, the second control signal 12b fails to be correctly received at the wireless device 2.

The wireless device 2 is thus unaware of any resource assignment for the second uplink payload signal and is unable to send the second uplink payload signal. If sent, any subsequent retransmissions of the second control signal 12b', 12b'', 12b''', 12b'''' will not be received by the wireless device 2, unless, by chance, they happen to occur during a later primary receiving period 20c. Most likely, the second uplink packet will be lost, which will have to be handled by higher layers, resulting in reduced performance and/or quality.

Figure 5:
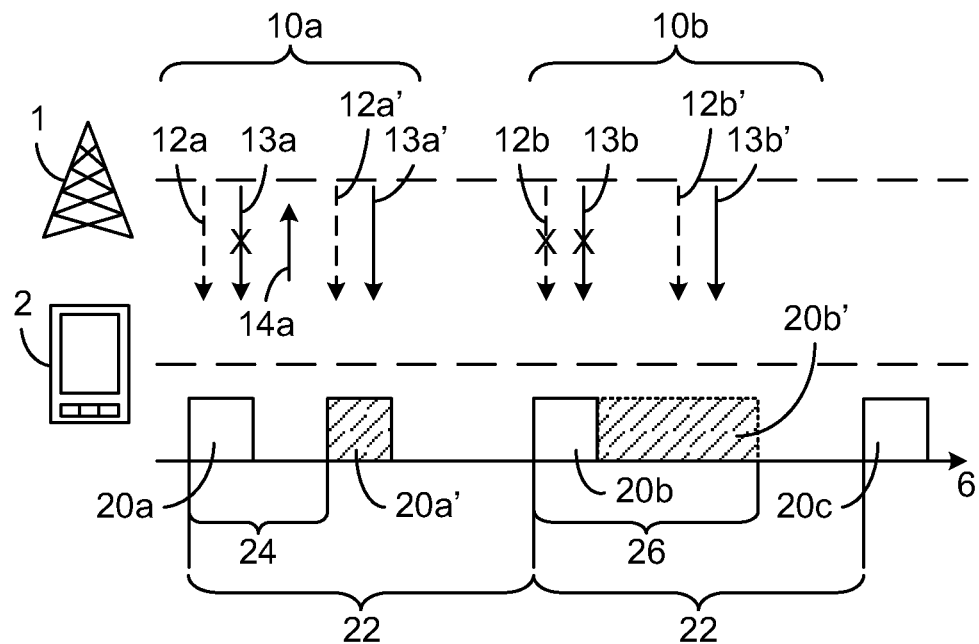

FIG. 5 illustrates a solution to the problem illustrated in FIG. 3. The first time period boa is identical to that of FIG. 3. In the second time period 10b, however, the new primary receiving period 10b is here extended to a new secondary receiving period 20b'. In this way, the new second downlink control signal 12b' can be received by the wireless device 2, allowing the wireless device 2 to know how to receive the retransmission of the second downlink payload signal 13b'. This allows, at least in some cases, a successful receipt of a downlink payload signal during DRX, even when the initial downlink control signal, defining how the downlink payload signal is to be received, is not received successfully.

This works since the wireless device 2 is aware of a situation where it expects a new downlink control signal in the following primary receiving period, such as for voice over LTE. This improves voice quality and has minimal impact on battery performance since it is only deployed when an expected downlink control signal is not correctly received.

Using the secondary receiving period, a modified discontinuous reception scheme is provided in the wireless device 2. The wireless device 2 can determine whether it should be expecting a control channel grant message for either DL or UL transmission. When the wireless device 2 expects a control signal with a resource assignment, but this is not received (for whatever reason including fading radio conditions or scheduling congestion), the wireless device 2 modifies the continuous reception scheme by adding a secondary receiving period to be able to receive the retransmission of the control signal with the resource assignment.

To illustrate, consider DRX settings as follows:
on duration 2 ms
inactivity period 2 ms
long DRX cycle=40 ms
no short DRX cycle This will define a 2 ms window for DL transmission or UL transmission.

If the wireless device 2 has not received a DL SID packet recently, then the wireless device 2 expects to receive a DL VoIP packet in every primary receiving period (during each "on duration"). Similarly, in the UL, if the wireless device 2 has SR mask activated, it should expect a grant every 40 ms (when packets are grouped together in pairs).

The radio base station 1 does not need to know if the wireless device 2 is configured to use the modified DRX scheme as herein described. But when the modified DRX scheme is implemented in the wireless device 2, the signaling will be robust to missed PDCCH messages when DRX is enabled.

Figure 6:
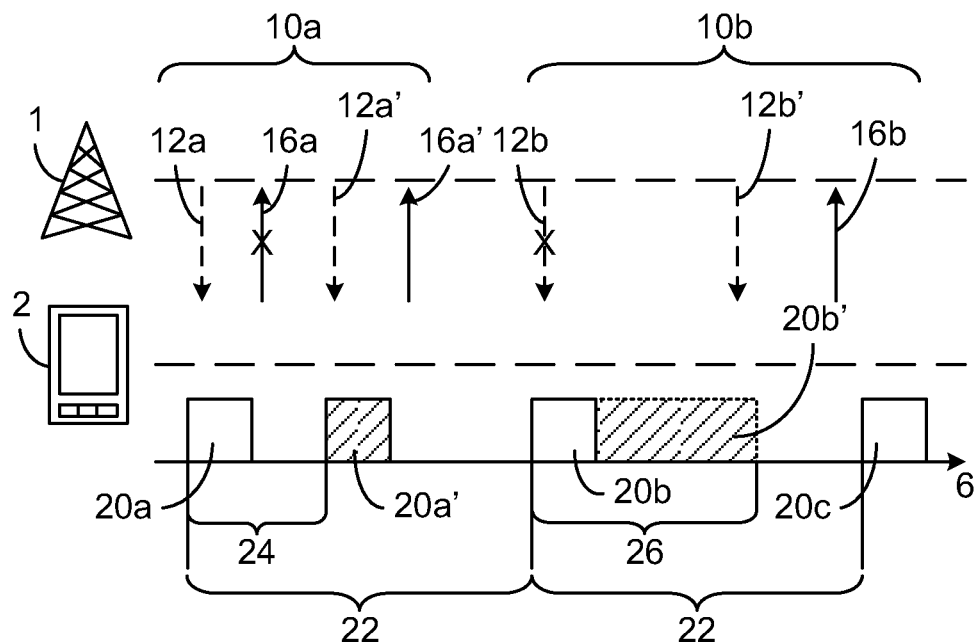

FIG. 6 illustrates a solution to the problem illustrated in FIG. 4. The first time period boa is identical to that of FIG. 4. In the second time period 10b, however, the new primary receiving period 20b is here extended to an extended secondary receiving period 20b'. In this way, the new second downlink control signal 12b' can be received by the wireless device 2, providing the resource allocation for the wireless device 2 to allow the transmission of the second uplink payload signal 1613 to be successfully received by the radio base station 1. This allows, at least in some cases, a successful receipt of an uplink payload signal during DRX, even when the initial downlink control signal, defining how the uplink payload signal is to be transmitted, is not received successfully.

Figure 7:
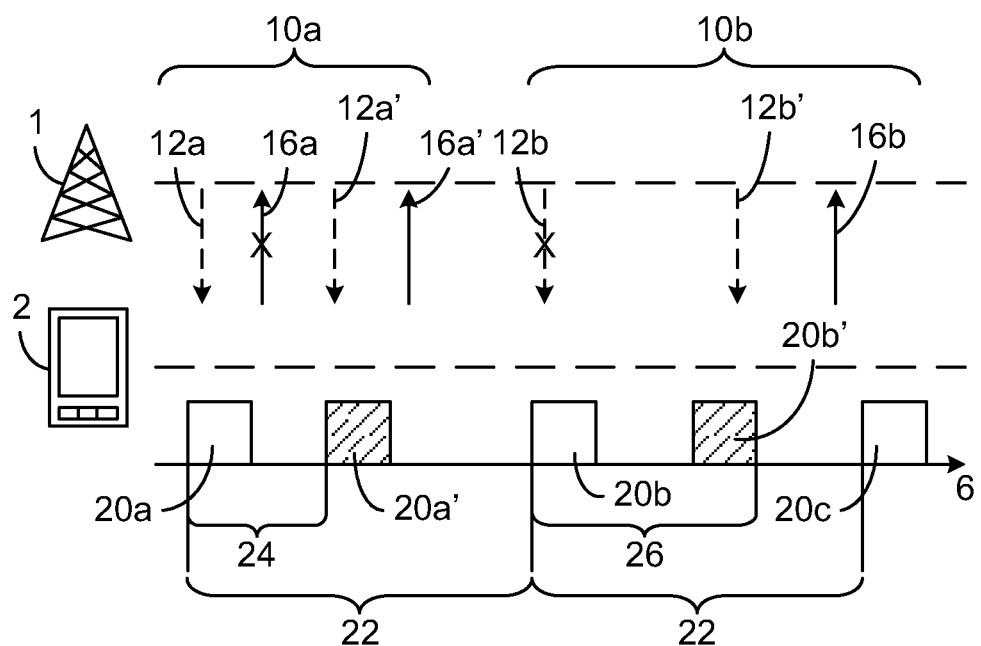

FIG. 7 illustrates a solution to the problem illustrated in FIG. 4. The only difference from the solution shown in FIG. 6, is that the secondary receiving period 10b' is separate from the new primary receiving period 10b. This increases the idle period, which reduces power requirements compared to the solution shown in FIG. 6.

Figure 8A:
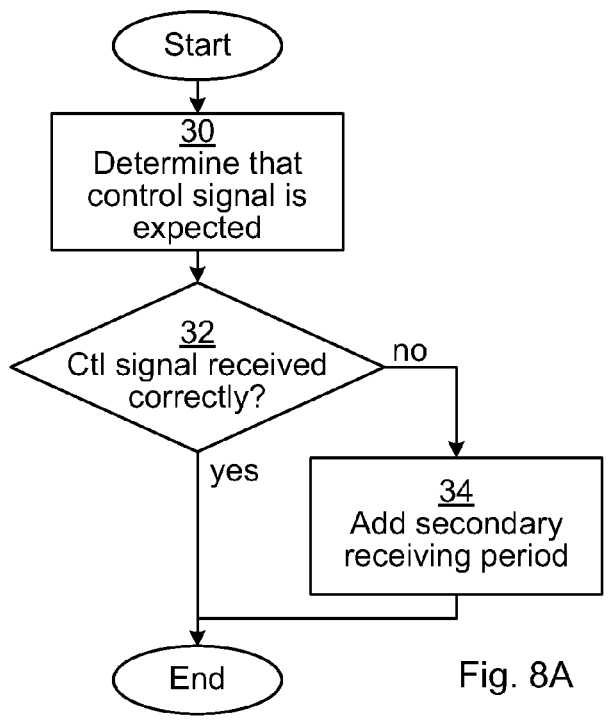
FIGS. 8A-B are flow charts illustrating method performed in the wireless device of FIG. 1.

FIG. 8A is a flow chart illustrating a method performed in the wireless device 2 of FIG. 1. The wireless device 2 being in a discontinuous reception mode, such as DRX, comprising receiving periods and idle periods as explained above. The wireless device 2 is only able to receive signals from the radio base station 1 during the receiving periods.

In a determine that control signal is expected step 30, the wireless device 2 determines that a control signal is expected to be received from the radio base station 1 during a primary receiving period. The primary receiving period is a period in a discontinuous reception scheme (such as DRX) when receiving is active. The determination can be based on the wireless device 2 being in talk mode of Voice Over Internet Protocol, VoIP. The control signal can e.g. be a control signal sent over PDCCH. Furthermore, the control signals can contain resource allocations for a future downlink payload signal or for a future uplink payload signal.

As explained above, if the wireless device has not received a DL SID packet recently, then the wireless device 2 expects to receive a DL VoIP packet in every primary receiving period (during each "on duration"). Similarly, in the UL, if the wireless device 2 has SR mask activated, it should expect a grant every 40 ms (when packets are grouped together in pairs).

In a conditional control signal received correctly step 32, it is determined whether the control signal, which was expected to be received, was received correctly or not during the primary receiving period (20b of FIG. 5). This can e.g.

be detected using cyclic redundancy check (CRC). If this is the case, the method ends. Otherwise, the method continues to an add secondary receiving period step 34.

In the add secondary receiving period step 34, a secondary receiving period (20b' of FIG. 5, 6, or 7) is added, which covers a first time interval when a new control signal (12b' of FIG. 5) is expected to be received. The new control signal may be due to the failed reception of the control signal, i.e. a retransmission. The first time interval can be placed in time such that it covers a round-trip delay time expected for HARQ, relative to the primary receiving period. The new control signal can e.g. be a new control signal sent over PDCCH.

The secondary receiving period can be added as an extension to the primary receiving period, i.e. the primary receiving period is extended (as shown in FIG. 5). Alternatively, the secondary receiving period is separate from the primary receiving period (as shown in FIG. 6). Both options are possible both for uplink and for downlink.

Using this method, the wireless device 2 reduces the time it needs to be in a receiving state to allow it to receive control signals, while it is still robust enough to address missed detection of control signals, e.g., on the PDCCH.

Moreover, there is no requirement for the radio base station 1 to know if the wireless device 2 implements the DRX scheme, but when the modified DRX scheme is implemented in the wireless device 2, the signaling will be robust to address missed control signals even when discontinuous reception (such as DRX) is enabled.

Figure 8B:
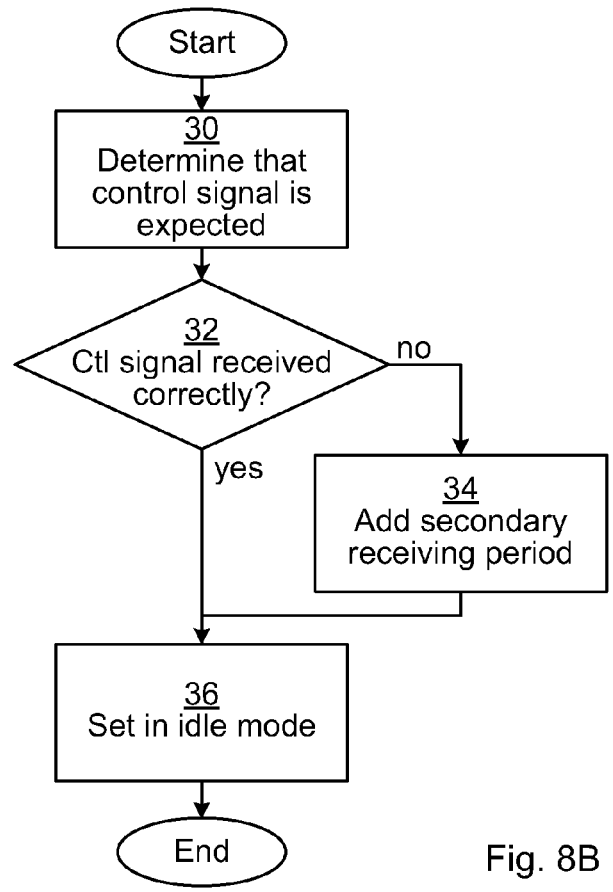

FIG. 8B is a flow chart illustrating a method performed in the wireless device 2 of FIG. 1. This method is similar to the method illustrated in FIG. 8A, and only new or modified steps, in relation to FIG. 8A, will be described.

In a set in idle mode step 36, the wireless device 2 sets at least some of its receiving modules in an idle mode when the receiving period has ended. This idle mode is an off period when the wireless device 2 is unable to receive wireless signals, which decreases power consumption, corresponding to the time between the receiving periods 20a, 20a', 20b, 20c of FIG. 5.

Figure 9:
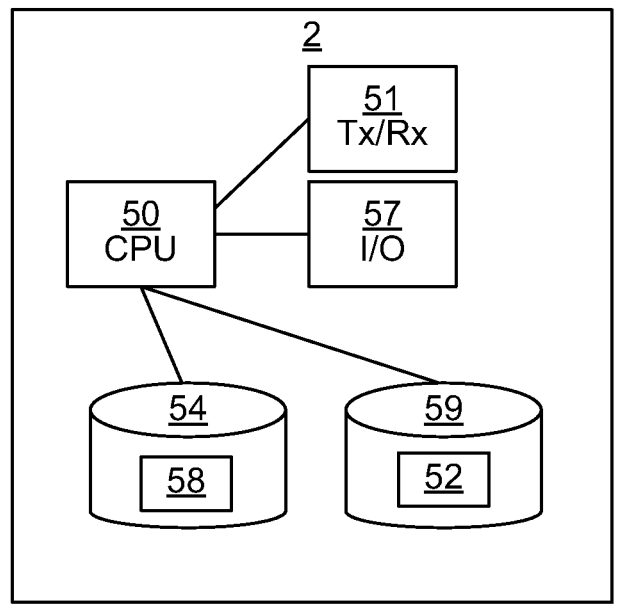
FIG. 9 is a schematic diagram illustrating some components of the wireless device of FIG. 1.

FIG. 9 is a schematic diagram showing some components of the wireless device 2 of FIG. 1. A processor 50 is provided using any combination of one or more of a suitable central processing units (CPU), microprocessors, microcontrollers, digital signal processors (DSP), application specific integrated circuits, etc., capable of executing software instructions contained in a computer program 58 stored in a computer program product 54, e.g. in the form of a memory, but not in the form of a signal or any form of electromagnetic wave. The processor 50 can be configured to execute the methods for a wireless device 2 described herein.

The computer program product 54 is here a memory being any combination of read and write memory (RAM) and read only memory (ROM). The memory also comprises persistent storage, which, for example, can be any one or combination of magnetic memory, optical memory, solid state memory or even remotely mounted memory. The processor 50 controls the general operation of the wireless device 2.

The wireless device 2 further comprises a data memory 59, which is a read-and-write memory. The data memory 59 may also comprises persistent storage, which, for example, can be any one or combination of magnetic memory, optical memory, solid state memory or even remotely mounted memory. The data memory 59 comprises a power state parameter repository 52, comprising one or more sets of power state parameters which are applicable for a combination of traffic types. Optionally, the computer program product 54 and the data memory 59 can form part of the same memory device.

The wireless device 2 further comprises an I/O interface 57 for communicating with external entities. The I/O interface 57 includes a user interface for receiving input from the user and providing feedback to the user, e.g., using a touch sensitive display, keypad, microphone, speaker, etc.

The wireless device 2 also comprises one or more transceivers 51 (or one or more separate transmitters and receivers), comprising analogue and digital components, and a suitable number of antennas for radio communication with radio base stations 1.

Figure 10:
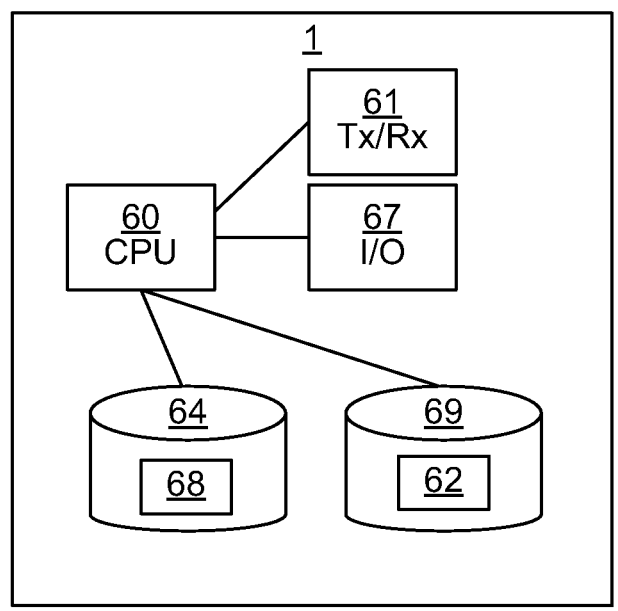
FIG. 10 is a schematic diagram illustrating some components of the radio base station of FIG. 1.

FIG. 10 is a schematic diagram showing some components of the radio base station 1 of FIG. 1. A processor 60 is provided using any combination of one or more of a suitable central processing unit (CPU), multiprocessor, microcontroller, digital signal processor (DSP), application specific integrated circuit etc., capable of executing software instructions contained in a computer program 68 stored in a computer program product 64, e.g. in the form of a memory, but not in the form of a signal or any form of electromagnetic wave. The processor 60 can be configured to execute the methods for a radio base station 1.

The computer program product 64 is here a memory being any combination of read and write memory (RAM) and read only memory (ROM). The memory also comprises persistent storage, which, for example, can be any one or combination of magnetic memory, optical memory, solid state memory or even remotely mounted memory. The processor 60 controls the general operation of the radio base station 1.

The radio base station 1 further comprises a data memory 69, which is a read-and-write memory. The data memory 69 may also comprises persistent storage, which, for example, can be any one or combination of magnetic memory, optical memory, solid state memory or even remotely mounted memory. The data memory 69 comprises a power state parameter repository 62, comprising one or more sets of power state parameters which are applicable for a combination of traffic types. Optionally, the computer program product 64 and the data memory 69 can form part of the same memory device.

The radio base station 1 further comprises an I/O interface 67 for communicating with external entities.

The radio base station 1 also comprises one or more transceivers 61 (or one or more separate transmitters and receivers), comprising analogue and digital components, and a suitable number of antennas for radio communication with wireless devices 2.

The radio base station 1 could be arranged to dynamically adapt its behaviour depending on whether a connected wireless device 2 implements the method of FIG. 8A or not, with additional secondary receiving periods when an expected control signal is not received. In such an embodiment, when the connected wireless device 2 does not implement the method, the radio base station 1 refrains from retransmitting control signals (see 12b, 12b', 12b'', 12b''', 12b'''' of FIG. 4) on the physical downlink control channel when the wireless device 2 is idle anyway due to DRX. On the other hand, when the connected wireless device 2 does implement the method, the radio base station 1 does retransmit the control signals (see 12b, 12b', 12b'', 12b''', 12b'''' of FIG. 4) on the physical downlink control channel to allow the wireless device 2 to receive the retransmission during a secondary receiving period.

To allow the radio base station 1 to distinguish between when the connected wireless device 2 implements the method or not, the wireless device 2 can send a message to the radio base station 1 to indicate its capability. This can e.g. be included in a UE capability indication message. This would enable further optimization especially in high load scenarios, where e.g. the radio base station 1 would not have to schedule wireless devices 2 that are suspected to be in DRX sleep.

Figure 11:
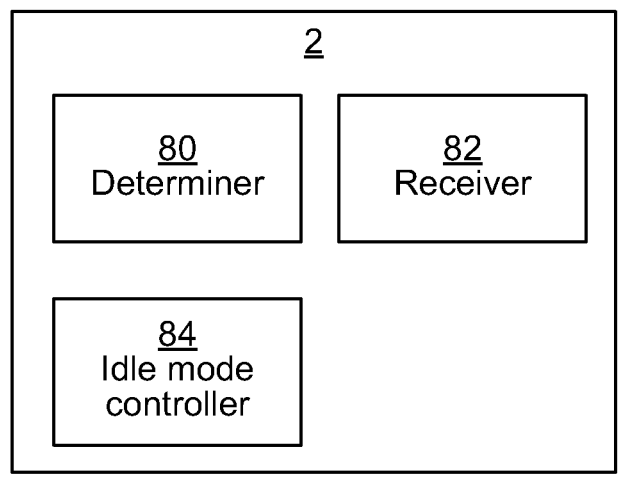
FIG. 11 is a schematic diagram showing functional modules of the wireless device of FIG. 1.

FIG. 11 is a schematic diagram showing functional modules of the wireless device 2 of FIG. 1. The modules can be implemented using software instructions such as a computer program executing in the wireless device 2 and/or using hardware, such as application specific integrated circuits, field programmable gate arrays, discrete logical components, etc. The modules correspond to the steps in the methods illustrated in FIGS. 8A-B.

A determiner 80 is arranged to determine that a control signal is expected to be received from a radio base station during a primary receiving period. This module corresponds to the determine that a control signal is expected step 30 of FIGS. 8A-B.

A receiver 82 is arranged to receive i.a. a control signal. This module implements the control signal received correctly step 32 of FIGS. 8A-B. In other words, the receiver 82 is arranged to detect when a control signal fails to be correctly received from the radio base station during the primary receiving period. This module corresponds to the conditional control signal received correctly step 32 of FIGS. 8A-B.

An idle mode controller 84 is arranged to add control the idle mode. This includes, when the control signal fails to be received during the primary receiving period, adding a secondary receiving period covering a first time interval when a new control signal is expected to be received. On the other hand, when a control signal is correctly received from the radio base station during the primary receiving period no secondary receiving period is added. Optionally, this module is also arranged to set at least some receiving modules in an idle mode when the receiving period has ended. This module corresponds to the add secondary receiver period step 34 of FIGS. 8A-B and the optional set in idle mode step 36 of FIG. 8B.

Figure 12:
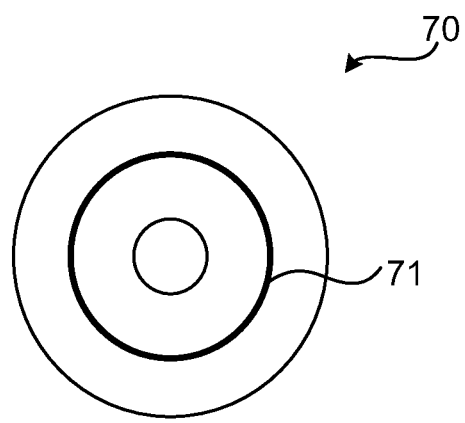
FIG. 12 shows one example of a computer program product comprising computer readable means.

FIG. 12 shows one example of a computer program product 70 comprising computer readable means. On this computer readable means a computer program 71 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 54 of FIG. 9 or the computer program product 64 of FIG. 10. While the computer program 71 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention.

The invention claimed is:

1. A method performed in a wireless device of a cellular network also comprising a radio base station, the wireless device being in a discontinuous reception mode comprising receiving periods and idle periods, the method comprising:

determining that a control signal is expected to be received from a radio base station during a primary receiving period;

when the control signal fails to be correctly received from the radio base station during the primary receiving period, adding a secondary receiving period as an extension to the primary receiving period, the secondary receiving period covering a first time interval when a new control signal is expected to be received; and when the control signal is correctly received from the radio base station during the primary receiving period, refraining from adding a secondary receiving period.

2. The method according to claim 1, wherein adding a secondary receiving period, the new control signal is expected to be received as a result of the failed reception of the control signal.

3. The method according to claim 1, further comprising:

setting at least some receiving modules in an idle mode when the receiving period has ended.

4. The method according to claim 1, wherein the wireless device is only able to receive signals from the radio base station during receiving periods.

5. The method according to claim 1, wherein in determining that a control signal is expected to be received from a radio base station during a primary receiving period, the primary receiving period is a period in a discontinuous reception scheme when receiving is active.

6. The method according to claim 1, wherein the first time interval covers a round-trip delay time expected for Hybrid Automatic Repeat reQuest, HARQ, relative to the primary receiving period.

7. The method according to claim 1, wherein determining that a control signal is expected to be received from a radio base station during a primary receiving period is based on the wireless device being in talk mode of Voice Over Internet Protocol, VoIP.

8. The method according to claim 1, wherein the control signals are signals sent over a physical downlink control channel.

9. The method according to claim 1, wherein the control signals contain resource allocations for a future downlink payload signal.

10. The method according to claim 1, wherein the control signals contain resource allocations for a future uplink payload signal.

11. The method of claim 1, wherein the control signal comprises a resource allocation for a transmission of a payload data, and the new control signal comprises a resource allocation for a retransmission of the payload data.

12. A wireless device arranged to be part of a cellular network also comprising a radio base station, the wireless device comprising:

a processor; and memory comprising instructions that, when executed by the processor, causes the wireless device, when in a discontinuous reception mode comprising receiving periods and idle periods, to:

determine that a control signal is expected to be received from a radio base station during a primary receiving period;

when the control signal fails to be correctly received from the radio base station during the primary receiving period, add a secondary receiving period as an extension to the primary receiving period, the secondary receiving period covering a first time interval when a new control signal is expected to be received; and when the control signal is correctly received from the radio base station during the primary receiving period, refrain from adding a secondary receiving period.

13. The wireless device according to claim 12, wherein in the instructions to add a secondary receiving period, the new control signal is expected to be received as a result of the failed reception of the control signal.

14. The wireless device according to claim 12, wherein the instructions further comprise instructions that, when executed by the processor, causes the wireless device to:
   set at least some receiving modules in an idle mode when the receiving period has ended.

15. The wireless device according to claim 12, wherein the wireless device is only able to receive signals from the radio base station during receiving periods.

16. The wireless device according to claim 12, wherein the instructions to determine that a control signal is expected to be received from a radio base station during a primary receiving period comprise instructions that, when executed by the processor, causes the wireless device to consider the primary receiving period to be a period in a discontinuous reception scheme when receiving is active.

17. The wireless device according to claim 12, wherein the first time interval covers a round-trip delay time expected for Hybrid Automatic Repeat reQuest, HARQ, relative to the primary receiving period.

18. The wireless device according to claim 12, wherein the instructions to determine that a control signal is expected to be received from a radio base station during a primary receiving period comprise instructions that are based on the wireless device being in talk mode of Voice Over Internet Protocol, VoIP.

19. The wireless device according to claim 12, wherein the control signals are signals sent over a physical downlink control channel.

20. The wireless device according to claim 12, wherein the control signals contain resource allocations for a future downlink payload signal.

21. The wireless device according to claim 12, wherein the control signals contain resource allocations for a future uplink payload signal.

22. The wireless device of claim 12, wherein the control signal comprises a resource allocation for a transmission of a payload data, and the new control signal comprises a resource allocation for a retransmission of the payload data.

23. A non-transitory computer readable medium storing computer program code which, when run on a wireless device arranged to be part of a cellular network also comprising a radio base station, causes the wireless device to:
   when the wireless device is in a discontinuous reception mode comprising receiving periods and idle periods:
      determine that a control signal is expected to be received from a radio base station during a primary receiving period;
      when the control signal fails to be correctly received from the radio base station during the primary receiving period, add a secondary receiving period as an extension to the primary receiving period, the secondary receiving period covering a first time interval when a new control signal is expected to be received; and
      when the control signal is correctly received from the radio base station during the primary receiving period, refrain from adding a secondary receiving period.

24. The non-transitory computer readable medium of claim 23, wherein the control signal comprises a resource allocation for a transmission of a payload data, and the new control signal comprises a resource allocation for a retransmission of the payload data.

* * * * *